Oct. 17, 1933.	P. R. DRENNING	1,930,743
PASSENGER TRUCK SUSPENSION
Filed Feb. 21, 1930	2 Sheets-Sheet 1
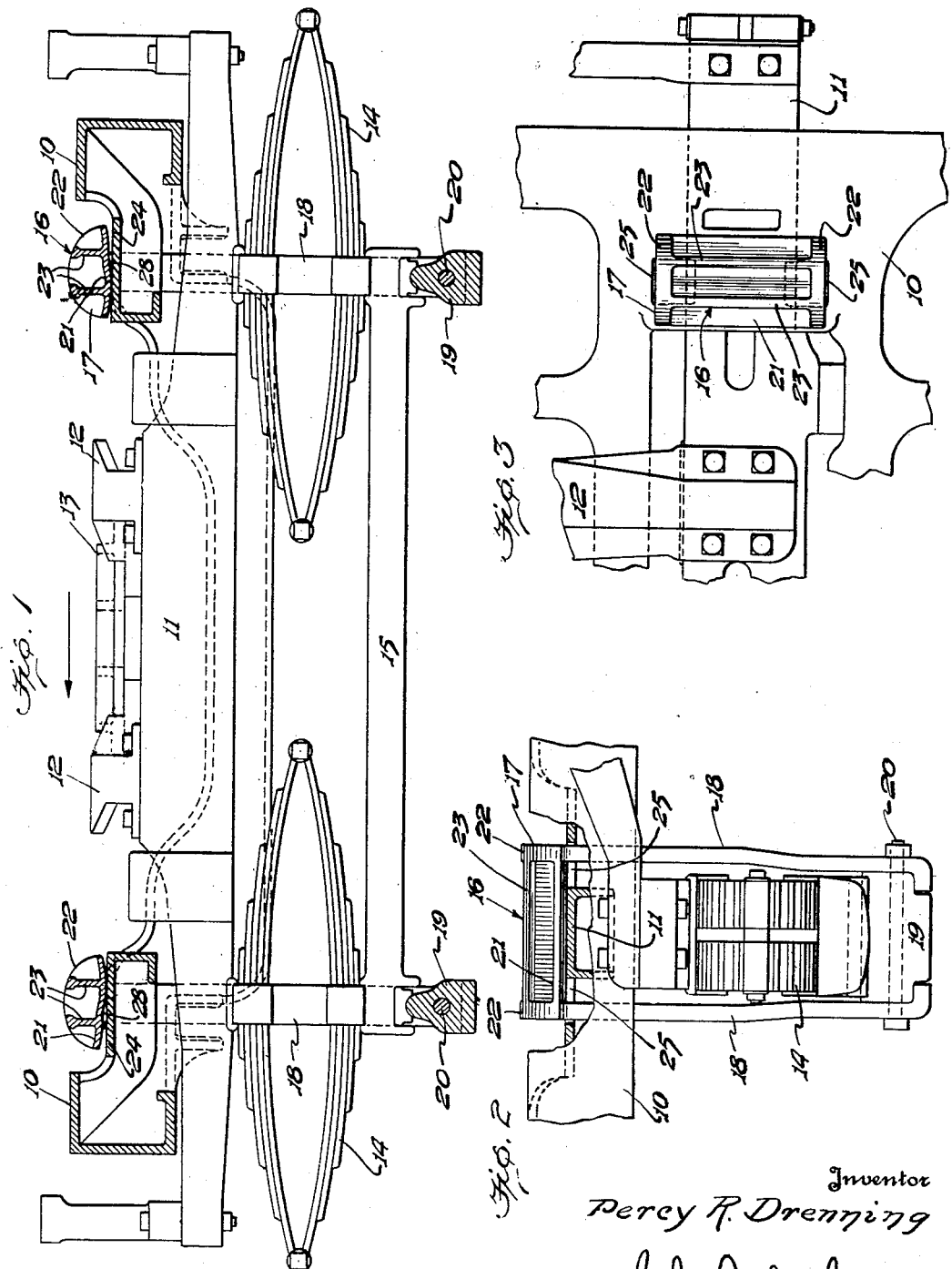
Inventor
Percy R. Drenning
By John Milton Kester
Attorney

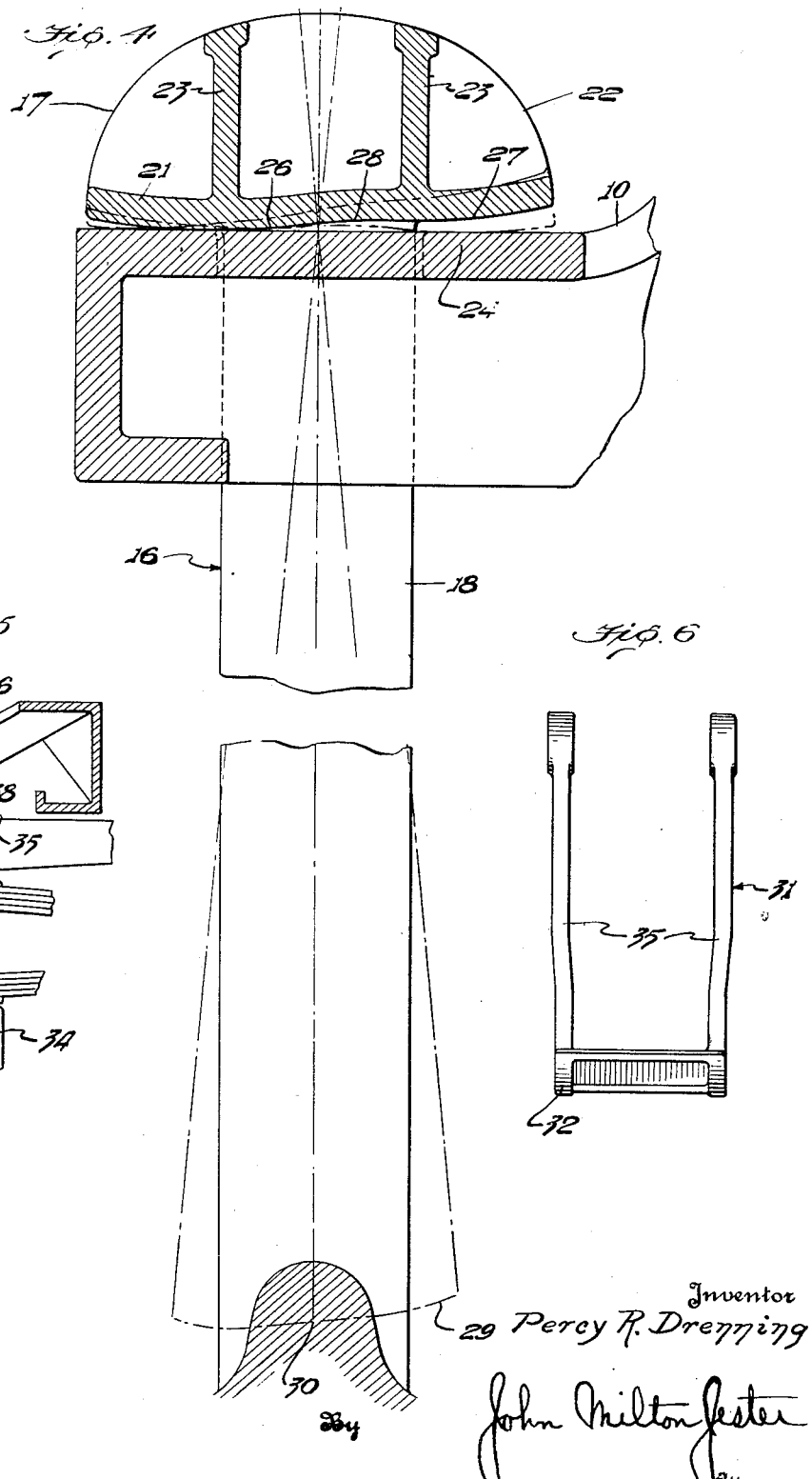

Patented Oct. 17, 1933

1,930,743

UNITED STATES PATENT OFFICE 1,930,743

PASSENGER TRUCK SUSPENSION

Percy R. Drenning, Baltimore, Md., assignor to T. H. Symington & Son, Inc., Baltimore, Md., a corporation of Maryland Application February 21, 1930. Serial No. 430,373

16 Claims. (Cl. 105—190)

The invention relates to railway trucks, particularly to those of the type used in connection with passenger cars.

It is well known that in the ordinary construction the load is sustained through suspension links so that there will be a free and easy lateral motion. Originally suspension links provided for this purpose depended vertically and were parallel. This gave the desired freedom of movement but did not provide for centering of the bolster and it was therefore necessary to make use of additional elements for the purpose of restoring the parts to normal or intermediate position upon the cessation of the force tending to produce lateral motion of the car body with respect to the truck. A further development was the arrangement of the suspension links in an inclined position diverging downwardly. This permitted the desirable swinging movement and at the same time provided for the restoration of the parts to normal position without the use of centering springs or the like. However, while the lateral motion should be free and easy at the start it is essential that it be checked after a certain predetermined movement in order to give the proper resistance as for example when rounding curves at high speeds, it being necessary to counteract or overcome the centrifugal force developed at such a time. As a matter of fact there is a lifting action when suspension links swing and the exact character of the movement depends upon the angular inclination. Under the present practice these links are ordinarily hung at an angle of about 7° from the vertical but this is admittedly only a compromise proposition.

It is with the above state of the art in view that I have devised the present invention which has for its general object the provision of a novel suspension means whereby there will be the utmost freedom of movement at the beginning of the swing, or start of the lateral motion while at the same time there will be adequate resistance to centrifugal force to insure safety and proper operation by relieving the parts of undue and excessive strains.

An important object is to provide a passenger truck suspension mechanism in which the links may depend vertically and yet be capable of bringing about the proper lifting action at the proper time.

A more specific object of the invention is to provide a passenger truck suspension in which there is a cam action which will give the desired lift curve.

Another object of the invention is to provide a truck suspension in which the cam means may be so designed as to bring about initial lowering of the car body at the inside of a curve accompanied by a gradual lifting at the outside followed by a more abrupt lift which will oppose the necessary resistance to check the lateral motion when it reaches a predetermined extent.

Another important object of the invention is to provide a suspension link mechanism in which the cam action may take place at the fulcrum points on the truck frame or at the fulcrum points beneath the spring plank.

A further object is to provide a suspension mechanism including hanger brackets of novel form which may be used without involving any great changes in the construction of the truck frame, and which in one form of the invention may be used to replace the ordinary hanger without necessitating any changes.

Still another object is to provide a suspension in which the links or hangers may have any desired cam formation at either of the fulcrum points specified so that the degree of swing prior to and after lift and the degree of lift may be made anything found most appropriate in service to meet the requirements of the particular type of car.

An additional object is to provide an arrangement or structure of this character which will be simple and inexpensive to manufacture, easy to install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a vertical cross sectional view through a passenger truck embodying my invention, Figure 2 is a fragmentary side elevation with parts broken away and in section to illustrate my hanger, Figure 3 is a fragmentary plan view, Figure 4 is a somewhat diagrammatic section on a greatly enlarged scale showing the development of the lift curve, Figure 5 is a fragmentary view partly in elevation and partly in section through one side of the truck showing a modification of the hanger, and Figure 6 is an elevation of the modified hanger alone.

Referring more particularly to the drawings it will be observed that I have shown a considerable part of a conventional passenger truck including side frames 10 within which are mounted bolsters 11 connected by the usual center bolster 12 equipped with bearing means 13 for cooperation with appropriate bearing means on the bottom of the car body. The truck is of the six wheel type, as is customary in passenger car design, but no side elevation is shown as such is believed to be unnecessary to a proper understanding of the present invention which relates only to the load suspension. Each bolster 11 is supported upon suitable springs 14 carried by a spring plank 15. In ordinary practice the spring plank is mounted within hangers which converge upwardly and which have their upper ends simply pivoted on the truck frame.

In carrying out my invention I provide novel hangers 16 for this purpose. Each of these hangers is here represented as comprising a main or bearing portion 17 from which extend arms or links 18 which are preferably though not necessarily integral therewith. At their lower ends the arms carry a fulcrum member 19 which engages beneath the spring plank 15 in the usual manner. For the sake of strength the lower ends of the arms 18 are shown as directed toward each other so as to engage beneath the fulcrum member 19 and give proper support thereto. Mounting of this member 19 may be effected simply by the employment of a bolt 20 passing through it and through the hanger arms. The upper or bearing portion 17 of each hanger is necessarily somewhat enlarged as it is intended to be of cam construction so as to be capable of bringing about the lifting action desired. This bearing portion comprises a bottom wall 21 joining side flanges 22 connected by transverse reinforcing ribs or webs 23. Obviously many variations may be resorted to in so far as these details are concerned as the only requisite is strength. The bottom wall 21 is formed as a cam, the details of which will be hereinafter described and is adapted to rock upon flat bearing surfaces 24 at the opposite sides of the truck frame, the frame having openings 25 therein for the passage of the arms 18.

At the very outset it should be understood that the precise shape of the cam surface of the underside of the wall 21 may be varied depending upon the exact movement desired. However, I have illustrated a shape which will be highly efficient for the purpose intended. In the present instance each hanger is shown as having the underside of its wall 21 formed with a convex curved portion 26 extending from one end to a point spaced somewhat from the center. The other end portion is likewise formed with a convex curved surface 27 merging into a concave curved surface 28 at the central portion merging in turn into the convex curved portion 26 though possibly this concave curvature might be replaced by a flat or plane surface under some circumstances. The point is that the curved surface 27 is at a higher level than the surface 26 when the hangers are in the normal position which they will occupy when there is no force tending to produce lateral motion. The reason for this peculiar shape is to obtain the desired lift curve illustrated at 29 in Figure 4, which curve is traced by a point 30 when the hanger swings in one direction or the other.

In the operation, it will be seen that under ordinary conditions, that is to say when the car is travelling over straight track and there is no lateral motion, the hangers 16 depend vertically with substantially the central portions of the convex surfaces 26 bearing upon the flat surfaces 24. Assuming that there occurs a force tending to move the bolster 11 in the direction of the arrow, the hangers will of course swing to the left, the bottom walls 21 of the bearing portions thereof rocking upon the bearing surfaces 24. The curved surface 26 of the right hand hanger will roll out of engagement with the surface 24 beneath it, during which time the point 30 will move downwardly along a curve which is substantially a straight inclined line. At the same time the curved surface 26 of the left hand hanger will roll upon the bearing surface 24 beneath it and the result will be a slight lifting effect, the point 30 travelling upwardly along a curve which is substantially a straight inclined line. This means that when lateral motion is started there is very slight resistance though the parts may move freely. It is true that the outer end lifts slightly at this time but as the inner end lowers, the two moments practically balance. After this free swinging movement has continued to a certain point, the surface 27 of the right hand hanger will come into engagement with the surface 24 beneath it and will bring about a fairly abrupt lifting action as the point of contact will be spaced considerably from the center of the wall 21. This rather abrupt lift is clearly disclosed at the left end of the curve 29 in Figure 4. At the same time, the point of contact of the bearing surface 27 on the left hand hanger with the surface 24 beneath it recedes from the center of the wall 21, thereby additionally increasing the lifting action as shown at the right end of the curve 29 in Figure 4. This rather abrupt lifting therefore occurs at both ends of the bolster and this provides the resistance necessary to oppose the centrifugal force which results from passage of the car over curved track at high speeds. If there is a tendency to produce lateral motion in the opposite direction, the same action occurs, that is to say the left hand hanger will first swing downwardly while the one at the right swings upwardly to a slight extent, subsequently to which they both lift more abruptly.

It is not necessary that the location of the cam means be confined to the top of the truck frame as in Figures 5 and 6 I have disclosed an arrangement wherein the cam means is beneath the spring plank. Referring to these figures in detail, the hanger 31, which is of U-shape, has a bight portion 32 corresponding to the portion 17 of the first form, this bight portion including a wall 33 formed with cam surfaces corresponding to the surfaces 26, 27 and 28 above described. This cam shaped bight portion is located within a suitable recess or pocket 34 in the underside of the spring plank and the arms 35 of the hanger project upwardly through the usual openings 36 in the truck frame where they are pivoted as by a transverse bolt 37 seated within a depression or recess 38 in the frame. The operation of this form is the same as that above described, the only difference being a matter of location.

From the foregoing description and a study of the drawings it will be apparent that I have thus provided a very simple car suspension which will have the maximum ease of movement at the beginning of lateral motion and which will insure ample resistance to abnormal or excessive lateral motion at the proper time or point in the swing to insure safety at all times especially when rounding curves at high speeds. The type of hanger shown in the first form of the invention can be used without involving any great changes in the truck construction and the one embodied in the second form can be used as a replacement with the usual type of hanger, the only change being a slight one in the spring plank. It is clear that the necessary parts will cost but little and may be installed easily. It is believed that the construction, operation and advantages will be apparent to one skilled in the art without further explanation.

While I have shown and described the preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a car truck including a frame, a bolster mounted therein for lateral motion, supporting means beneath the bolster, and hangers suspended from the frame and engaging beneath said supporting means, said hangers having cam means thereon for effecting lowering and lifting of the ends of the bolster to a different extent upon the occurrence of lateral motion thereof.

2. In a car truck, a frame, a bolster capable of lateral motion, spring means beneath the bolster, supporting means beneath the spring means, and suspension hangers mounted at their upper ends upon the frame and having their lower ends engaging said supporting means, one end of each hanger having cam means thereon cooperating with the contacting surface for controlling the lowering and lifting of the respective ends of the bolster to a different extent upon the occurrence of lateral motion.

3. In a car truck, a frame, a bolster mounted therein for lateral motion, springs beneath the bolster, a spring plank carrying the springs, and suspension means for the bolster comprising hangers rockably mounted at their upper ends upon the frame and having their lower ends fulcrumed beneath the spring plank, one end of each hanger having a plurality of cam surfaces thereon coacting with the contacting surface to effect unequal lifting of the ends of the bolster.

4. In a car truck, a frame, a bolster mounted therein for lateral motion, springs beneath the bolster, a spring plank carrying the springs, and suspension means for the bolster comprising hangers rockably mounted at their upper ends upon the frame and having their lower ends fulcrumed beneath the spring plank, one end of each hanger having plural cam means thereon coacting with the contacting surface to bring about a differential between the extent of vertical movement of the ends of the bolster.

5. In a railway truck, a frame, a bolster therein capable of lateral motion, a spring plank, springs carried by the spring plank and carrying the bolster, and suspension means for the spring plank comprising substantially U-shaped hangers having their arms passing through openings in the frame, the hangers being fulcrumed upon the frame and beneath the spring plank, each hanger having a bight portion constituting one of the fulcrums with said bight portion formed with spaced cam surfaces of different curvatures and sequentially effective to control the degree of lift of the respective ends of the bolster when lateral motion occurs.

6. In a railway truck, a frame, a bolster therein capable of lateral motion, a spring plank, springs carried by the spring plank and carrying the bolster, and suspension means for the spring plank comprising substantially U-shaped hangers having their arms passing through openings in the frame, the hangers being fulcrumed upon the frame and beneath the spring plank, each hanger having a bight portion constituting one of the fulcrums, said bight portion being formed with a pair of adjacent cam surfaces of different curvature sequentially effective to control the degree of lift of the respective ends of the bolster when lateral motion occurs, one of said surfaces constituting the bearing under normal or straightahead conditions and the other being engageable with the adjacent coacting surface to effect an abrupt lifting of an end of the bolster.

7. In a railway truck, a frame, a bolster therein capable of lateral motion, a spring plank, springs carried by the spring plank and carrying the bolster, and suspension means for the spring plank comprising substantially U-shaped hangers having their arms passing through openings in the frame, the closed end of the U being constructed as a cam having differently curved active surfaces adapted to become sequentially operative so as to give varying degrees of resisting moment arms as lateral motion occurs.

8. In a railway truck, a frame, a bolster therein capable of lateral motion, a spring plank, springs on the spring plank carrying the bolster, suspension means for the spring plank and means cooperating with the suspension means for effecting initial vertical movement of the respective ends of the bolster in opposite directions upon the occurrence of lateral motion.

9. In a railway truck, a frame, a bolster therein capable of lateral motion, a spring plank, springs on the spring plank carrying the bolster, and suspension means for the spring plank comprising substantially U-shaped hangers having bight portions formed as cams cooperating with the contacting surfaces to effect initial lowering and then lifting of the bolster upon the occurrence of lateral motion.

10. In a truck, a frame, a bolster mounted therein, a spring plank, spring means on the plank supporting the bolster, and suspension means for the plank comprising substantially U-shaped hangers having cam surfaces thereon for cooperation with the adjacent surfaces, said cam surfaces being of compound curved shape for effecting an initial lowering and subsequent lifting of the bolster upon lateral motion thereof.

11. In a truck, a frame, a bolster mounted therein, a spring plank, spring means on the plank supporting the bolster, and suspension means for the plank comprising substantially U-shaped hangers having cam surfaces thereon for cooperation with the adjacent surfaces, said cam surfaces being of compound curved shape for effecting an initial lowering and subsequent lifting of the bolster upon lateral motion thereof, the line of contact between the cam surfaces and the cooperating surface shifting laterally of the vertical axis of the truck when lateral motion of the bolster takes place.

12. In a railway truck, a frame, a bolster mounted therein for lateral motion, a spring plank, spring means interposed between the plank and the bolster, and suspension means for the plank comprising hangers each having a bearing surface formed as a rocker of compound curved shape whereby upon lateral motion of the bolster the line of bearing between the hangers and the coacting surfaces will be bodily shifted with respect to the center of the truck for effecting initial lowering and then lifting of the bolster, the lifting of the respective ends being to a different extent.

13. In a railway car truck, a frame, a bolster, a spring plank, spring means located between the plank and the bolster, and suspension means for the plank comprising U-shaped hangers having their bight portions engaged beneath the spring plank and having their arms pivotally supported upon the frame, said bight portions being of cam formation and providing a plurality of spaced fulcrum points to control raising and lowering of the bolster upon lateral motion thereof.

14. In a railway truck, a bolster capable of lateral motion, suspension means for supporting the bolster, and means cooperating with the suspension means for initially lowering and then raising the bolster upon the occurrence of lateral motion.

15. In a railway truck, a bolster capable of lateral motion, suspension means for supporting the bolster from its underside, and means forming part of said suspension means for initially lowering one end of the bolster while lifting the other end and then lifting the initially lowered end and continuing to lift the second named end upon the occurrence of lateral motion of the bolster.

16. In a railway truck, a bolster capable of lateral motion, means for supporting the bolster, and means forming part of the supporting means for initially lowering one end of the bolster while lifting the other end and then lifting the initially lowered end while continuing to lift the second named end upon the occurrence of lateral motion of the bolster.

PERCY R. DRENNING.